United States Patent
Oh et al.

(10) Patent No.: US 11,832,106 B2
(45) Date of Patent: Nov. 28, 2023

(54) 5G-IOT INTELLIGENT TRUST ENABLER SYSTEM

(71) Applicant: Korea Advanced Institute of Science and Technology, Daejeon (KR)

(72) Inventors: Hyeontaek Oh, Daejeon (KR); Minkyung Kim, Daejeon (KR); JunKyun Choi, Daejeon (KR); Nakyoung Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 110 days.

(21) Appl. No.: 17/521,535

(22) Filed: Nov. 8, 2021

(65) Prior Publication Data
US 2022/0167174 A1 May 26, 2022

(51) Int. Cl.
*H04L 9/40* (2022.01)
*H04W 12/60* (2021.01)
*H04W 12/043* (2021.01)

(52) U.S. Cl.
CPC ............ *H04W 12/66* (2021.01); *H04L 63/20* (2013.01); *H04W 12/043* (2021.01)

(58) Field of Classification Search
CPC ...... H04W 12/66; H04W 12/043; H04L 63/20
USPC ........................................................... 726/3
See application file for complete search history.

(56) References Cited

U.S. PATENT DOCUMENTS

| 2006/0095386 | A1  | 5/2006  | Jun et al. |
| 2018/0293387 | A1* | 10/2018 | Bar-El ................. H04L 63/123 |
| 2018/0367573 | A1* | 12/2018 | Ouyang ............... H04W 12/08 |
| 2019/0349346 | A1* | 11/2019 | Curtis ................. H04W 12/084 |
| 2020/0259660 | A1* | 8/2020  | Tewari ................. H04L 9/3236 |
| 2021/0149739 | A1* | 5/2021  | Danilchenko ......... G06F 16/367 |
| 2021/0266176 | A1* | 8/2021  | Kapinos ............... H04L 9/3239 |
| 2022/0070178 | A1* | 3/2022  | Lee ...................... H04L 63/126 |

FOREIGN PATENT DOCUMENTS

| KR | 10-2017-008463 | 7/2017 |
| KR | 1020170127339 | 11/2017 |
| KR | 1020180105044 | 9/2018 |
| KR | 1020200010624 | 1/2020 |

OTHER PUBLICATIONS

Hyeontaek Oh, Jaewon Ahn, Jaeseob Han, Jun Kyun Choi, A study on trust based doorlock for trustworth peer-to-peer accommodation services, Korea Advanced Institute of Science and Technology (KAIST), Jun. 2017 1493-1494.

Wise Iot Consortium: "Integrated IoT platforms—Release 1", May 30, 2017, pp. 21-23, figure 14.

(Continued)

*Primary Examiner* — Michael S McNally
(74) *Attorney, Agent, or Firm* — PCFB LLC

(57) ABSTRACT

An intelligent trust enabler system for a 5G IoT (fifth-generation Internet of Things) environment includes: an IoT trust enabler mounted on an edge and gateway on a fifth-generation (5G) IoT infrastructure, for providing trust information based on data collected from IoT devices and performing operation and management of connected IoT resources; and an IoT trust agent for providing a legacy environment for the IoT trust enabler.

20 Claims, 7 Drawing Sheets

(56) References Cited

OTHER PUBLICATIONS

"Framework for Trust based Personal Data Management; Y.3055 (09/20)", ITU-T Standard Y.3055, International Telecommunication Union, Geneva; Sep. 29, 2020, pp. 23-29.

Hyeontaek Oh : "Draft Recommendation ITU-T Y.trust-pdm: Framework for Trust based Personal Data Management Platform", ITU-T Draft; Study Period2017-2020; Study Group 13; Series C17, International Telecommunication Union, Geneva; Sep. 17, 2019, pp. 1-37.

Jayasinghe Upul et al: "Data centric trust evaluation and prediction framework for IOT", 2017 ITU Kaleidoscope: Challenges for a Data-Driven Society (ITU K), ITU, Nov. 27, 2017, pp. 1-7.

* cited by examiner

5G-IOT INTELLIGENT TRUST ENABLER SYSTEM

CROSS-REFERENCES TO RELATED APPLICATION

This application is based on and claims priority under 35 U.S.C. 119 to Korean Patent Application No. 10-2020-0156444, filed on Nov. 20, 2020, and Korean Patent Application No. 10-2021-0135516, filed on Oct. 13, 2021, in the Korean intellectual property office, the disclosures of each of which are incorporated herein by reference in its entirety.

BACKGROUND OF THE INVENTION

Field of Invention

The following description relates to a trust enabler technology that ensures trust in operation and management environments.

Description of Related Art

With the advance of fifth-generation (5G) mobile communication services, 5G IoT cloud platforms are expected to be commonly used in various industrial applications and a variety of IoT service scenarios combined with convergence ecosystems are emerging.

For example, Korean Laid-Open Patent Publication No. 10-2017-0084636 (published on Jul. 20, 2017) discloses a network system in which a software-defined networking (SDN)-based network controls packet in the Internet of Things (IoT).

There are so many diverse things in each industry that need monitoring and management through IoT devices, and traditional remote management approaches are not enough. Existing communications network management (e.g., CMIP/SNMP) or remote management (e.g., TR-69) approaches are hard to apply, because they use various IoT products from a variety of different manufacturers, making it impossible to provide operation and management in a unified manner.

Moreover, IoT is on the verge of giving up full dependence on artificial intelligence (AI) algorithms, in order to identify various unusual conditions or problems in a situation where numerous equipment and stakeholders coexist.

BRIEF SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides situational (or context) awareness operation and management through IoT data analysis so as to share optimal operational experiences (collective experiences) that suit different industrial ecosystems and deal with emergencies through cumulative learning.

The present disclosure provides a trust enabler technology at the level of an IoT ecosystem including users, data, devices, services, etc., in order to ensure trust in operation and management environments in a situation where numerous equipment and stakeholders coexist.

An exemplary embodiment of the present disclosure provides a computer system including at least one processor configured to execute computer-readable commands contained in a memory, the at least one processor including: an IoT trust enabler mounted on an edge and gateway on a fifth-generation (5G) IoT infrastructure, for providing trust information (i.e., information for assessing trust) based on data collected from IoT devices and performing operation and management of connected IoT resources; and an IoT trust agent for providing a legacy environment for the IoT trust enabler.

According to one aspect, the IoT trust enabler may include a function for checking whether an IoT device that has transferred the data is suitable or not, including whether the corresponding IoT device is connectable or not, and a function for managing and controlling access from the IoT device that has transferred the data by managing a trust specification of the corresponding IoT device.

According to another aspect, the IoT trust enabler may include a function for classifying the data collected from the IoT devices according to data attributes, and comprises a data interoperation model for managing associations between data formats and data models, in order to process the data collected from the IoT devices into a single common form.

According to another aspect, the IoT trust enabler may include a function for transferring the data collected from the IoT devices to at least one other IoT trust enabler, and a function for transferring the data collected from the IoT devices to an external user.

According to another aspect, the IoT trust enabler may include a function for analyzing situational (or context-aware) information related to a corresponding IoT device based on the data collected from the IoT devices and providing the same, and a function for analyzing unusual conditions based on the data collected from the IoT devices and providing analysis results.

According to another aspect, the IoT trust enabler may include a function for analyzing trust in at least one among an IoT resource, a stakeholder, and an IoT-based service that belong to the IoT trust enabler and providing trust analysis results.

According to another aspect, the IoT trust enabler may define indicators affecting the level of trust and perform trust analysis, based on a modeling method in which factors affecting the analysis of trust in each trustee and analysis models are classified.

According to another aspect, the IoT trust enabler may standardize the trust analysis results and provide the same to at least one other IoT trust enabler.

According to another aspect, the IoT trust enabler may construct a model for evaluating the level of trust in the trustee and calculate trust indicators by training the constructed model on information related to the trustee.

According to another aspect, the trust indicators may include direct trust indicators including at least one of ability, benevolence, and integrity which are indicators that allow for evaluation from direct information without interaction between trustor and trustee, and indirect trust indicators including at least one of experience, reputation, and inclination which are indicators that allow evaluation from additional information derived from interaction between trustor and trustee.

According to another aspect, the IoT trust enabler may calculate the trust indicators by applying a natural language processing technique to the information related to the trustee and analyzing the information processed by the natural language processing technique by binary classification.

According to another aspect, the IoT trust enabler may calculate the trust indicators by receiving, as input, information representing subjective factors including a past history of use by the trustee and views on the trustee from an external system or from the user.

According to another aspect, the IoT trust enabler may evaluate the level of trust in the trustee by adding weights for the indirect indicators and direct indicators that are inputted from the user.

According to another aspect, the IoT trust enabler may include a function for searching for an available IoT resource registered in the IoT trust enabler and connecting to the same, a function for configuring the operation of an IoT resource according to a service object when mapping a new service, and a function for organically controlling multiple IoT resources by coordinating the relationships between the resources or the order of execution.

Another exemplary embodiment of the present disclosure provides a method for controlling a trust enabler executed in a computer system, the computer system including at least one processor configured to execute computer-readable commands contained in a memory, the method including providing trust information based on data collected from IoT devices by using an IoT trust enabler mounted on an edge and gateway on a fifth-generation (5G) IoT infrastructure, the providing of trust information comprises analyzing trust in at least one among an IoT resource, a stakeholder, and an IoT-based service that belong to the IoT trust enabler and providing trust analysis results, wherein the IoT trust enabler defines indicators affecting the level of trust and performs trust analysis, based on a modeling method in which factors affecting the analysis of trust in each trustee and analysis models are classified.

According to the embodiments of the present disclosure, it is possible to share optimal operational experiences that suit different industrial ecosystems and deal with emergencies through cumulative learning, by providing situational (or context) awareness operation and management through IoT data analysis.

According to the embodiments of the present disclosure, it is possible to ensure trust in operation and management environments in a situation where numerous equipment and stakeholders coexist, by providing a trust enabler technology at the level of an IoT ecosystem including users, data, devices, services, etc.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Hereinafter, an embodiment of the present disclosure will be described in detail with reference to the accompanying drawings.

Embodiments of the present disclosure relate to an intelligent trust enabler system for a 5G IoT environment.

Embodiments including those specifically disclosed herein can ensure trust in operation and management environments in a situation where numerous equipment and stakeholders coexist, by providing a trust enabler technology at the level of an IoT ecosystem including users, data, devices, services, etc.

Technologies based on trust analysis of ecosystem stakeholders are being applied to create a secure IoT ecosystem. Trust-based models such as trust-based access authority control are being suggested as a solution to problems in distributed environments such as IoT. In this regard, trust technologies are required in the fields of 5G networks and artificial intelligence as well.

Attempts are being made to use 5G to connect large quantities of devices and overcome security and privacy issues through trust analysis of connected devices and stakeholders. Moreover, blockchain technologies for supplementing the stability and integrity of devices and data are expected to be incorporated with state-of-the art technologies such as IoT, 5G, and AI.

There is a need for a solution and technology based on trust and AI that can solve data security and privacy issues and other various management issues.

In this embodiment, it is possible to create a secure and reliable 5G-IoT hyper-connected ecosystem based on IoT data trust by means of a trust enabler that supports IoT artificial intelligence, data processing and analysis, hyper-connected situational (or context-aware) information modeling, trust measurement indicator definitions, and Trust-Chain.

Figure 1:
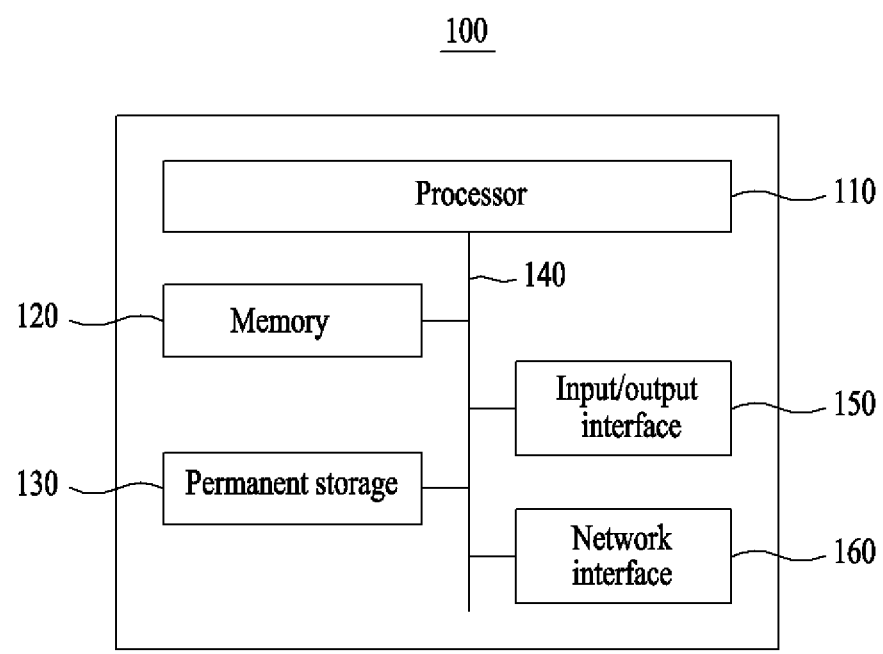
FIG. 1 is an exemplary block diagram illustrating an internal configuration of a computer system according to an embodiment of the present disclosure.

FIG. 1 is an exemplary block diagram illustrating an internal configuration of a computer system according to an embodiment of the present disclosure. For example, an IoT trust enabler system according to embodiments of the present disclosure may be implemented through a computer system 100 of FIG. 1. As depicted in FIG. 1, the computer system 100 is a component for executing an IoT trust enabler control method, and may include a processor 110, memory 120, permanent storage 130, a bus 140, an input/output interface 150, and a network interface 160.

The processor 110 is a component for an IoT trust enabler, and may include or be part of a certain device capable of processing a sequence of commands. The processor 110 may include, for example, a computer processor, a processor within a mobile device or other electronic device, and/or a digital processor. The processor 110 may include, for example, a server computing device, a server computer, a series of server computers, a server farm, a cloud computer, and a content platform. The processor 110 may be connected to the memory 120 via the bus 140.

The memory 120 may include volatile memory, permanent memory, virtual memory, or other types of memory for storing information used or outputted by the computer system 100. The memory 120 may include, for example, random access memory (RAM) and/or dynamic RAM (DRAM). The memory 120 may be used to store certain information such as state information of the computer system 100. For example, the memory 120 also may be used to store commands of the computer system 100, including commands for the IoT trust enabler. The computer system 100 may include one or more processors 110, if necessary or appropriate.

The bus 140 may include a communication infrastructure that enables interactions between various components of the computer system 100. The bus 140 may carry data between components of the computer system 100—for example, between the processor 110 and the memory 120. The bus 140 may include a wireless and/or wired communication medium between the components of the computer system 100, and may include parallel, serial, or other topological arrangements.

The permanent storage 130 may include components like memory, such as used by the computer system 100 or other permanent storage, to store data for a certain extended period of time (for example, compared to the memory 120). The permanent storage 130 may include nonvolatile main memory, such as used by the processor 110 within the computer system 100. The permanent storage 130 may include, for example, flash memory, a hard disk, an optical disk, or other computer-readable medium.

The input/output interface 150 may include interfaces for a keyboard, a mouse, voice command input, a display, or other input or output devices. Configuration commands and/or inputs for the IoT trust enabler may be received via the input/output interface 150.

The network interface 160 may include one or more interfaces for networks like a short-range network or the internet. The network interface 160 may include interfaces for wired or wireless connections. Configuration commands and/or inputs for the IoT trust enabler may be received via the network interface 160.

In addition, in other embodiments, the computer system 100 may include more components than in FIG. 1. However, there is no need to clearly illustrate most of conventional components. For example, the computer system 100 may include at least some of input/output devices connected to the above-described input/output interface 150, or may further include other components such as a transceiver, a global positioning system (GPS) module, a camera, various kinds of sensors, a database, and so on.

Hereinafter, a concrete embodiment of an intelligent trust enabler system for a 5G IoT environment will be described.

Figure 2:
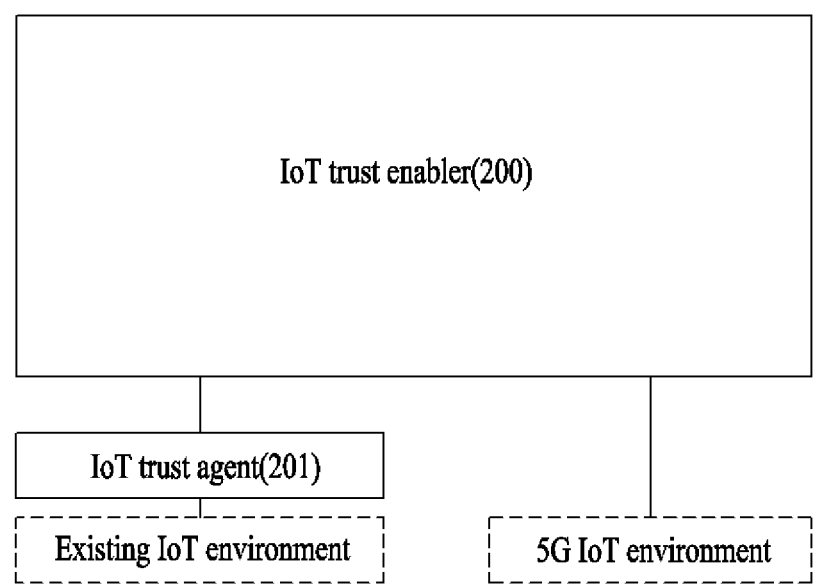
FIG. 2 is a block diagram illustrating an overall structure of an IoT trust enabler system according to one embodiment of the present disclosure.

FIG. 2 is a block diagram illustrating an overall structure of an IoT trust enabler system according to one embodiment of the present disclosure.

Referring to FIG. 2, the IoT trust enabler system according to the present disclosure may include an IoT trust enabler 200 for a 5G IoT environment and an IoT trust agent 201 for a legacy environment.

The IoT trust enabler 200 may be mounted on an edge, gateway, etc. on the 5G IoT infrastructure, ensures trust through data collected from various IoT devices, and at the same time provides efficient operation and management of hyper-connected IoT resources through analysis of a variety of situations.

The IoT trust enabler 200 may provide comprehensive support for existing IoT environments through the IoT trust agent 201, as well as for 5G environments. The IoT trust agent 201 may be applied in legacy IoT environments or the like where the IoT trust enabler 200 is not directly applicable, and may be delegated to perform functions of the IoT trust enabler 200, thereby ensuring trust in management environments and providing efficient operation and management of IoT resources.

Figure 3:
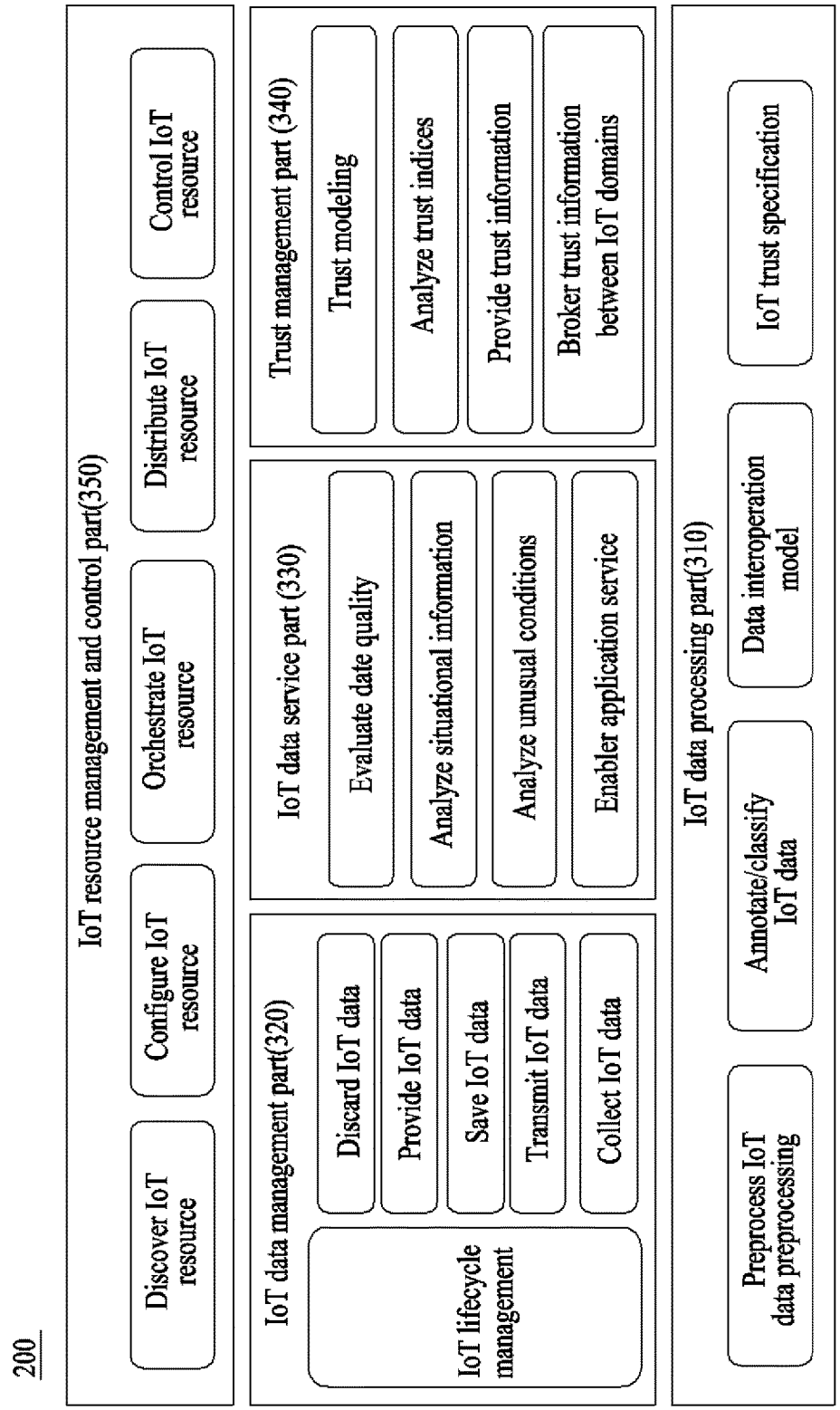
FIG. 3 is a block diagram illustrating a detailed configuration of an IoT trust enabler according to an embodiment of the present disclosure.

As depicted in FIG. 3, the IoT trust enabler 200 may include an IoT data processing part 310, an IoT data management part 320, an IoT data service part 330, a trust management part 340, and an IoT resource management and control part 350.

Referring to FIG. 3, the IoT data processing part 310 serves to process collected IoT data to use it in the enabler system, and may check whether an IoT device that has transferred data is suitable or not (whether the device is connectable to the enabler system or not), as well as directly processing data.

The IoT data processing part 310 may include, as a function for processing original data collected from an IoT device, an IoT data preprocessing function which helps maintain the quality of data to be stored later in the enabler through the processing of data collection errors or the like that may occur in a variety of operational environments.

The IoT data processing part 310 may include a data classification function that classifies data for use in the enabler system according to attributes (data type, data providing device, etc.) obtained by preprocessing collected data.

The IoT data processing part 310 may include a data interoperation model for managing associations between data formats of various IoT devices and data models, in order to process various forms of IoT data collected from multiple kinds of IoT devices into a single common form.

The IoT data processing part 310 may include an IoT trust specification function that manages a trust specification of an IoT device that has transferred data and manages and controls access to the enabler from actually connected IoT devices based on the level of trust.

Referring to FIG. 3, the IoT data management part 320 serves to provide an appropriate function for each data processing step to securely use data collected from the IoT data processing part 310.

The IoT data management part 320 may be linked to the IoT data processing part 310, and may include an IoT data collection function for storing data that can be used (or needs to be used) in the trust enabler environment.

The IoT data management part 320 may include, as a function for transmitting IoT data, like exchanging data between systems, an IoT data transmission function that processes IoT data in such a way as to be securely transferred to an internal module or another connected trust enabler.

The IoT data management part 320 may include an IoT data storage function that stores collected and processed IoT data in the trust enabler system according to the intended use or the data attributes.

The IoT data management part 320 may include, as a function for providing IoT data, like exchanging data with a user external to the system, an IoT data storage function that processes data of the trust enabler to be transferred to users in such a way that the users securely get the data they want.

The IoT data management part 320 may include an IoT data discard function that securely discards data if the data cannot be used any longer in the enabler system because the data is not valid for the intended use or its validity expires.

The IoT data management part 320 may include an IoT data lifecycle management function that records how data is used and manages the status of data used in the trust enabler system by intervening in the processes of collecting, transmitting, storing, providing, and discarding IoT data.

Referring to FIG. 3, the IoT data service part 330 is one of core functions of the enabler which is in charge of a variety of related services for IoT trust enabler service, and serves key functions such as data analysis, situational (or context-aware) information analysis, and so on.

The IoT data service part 330 may include a data quality evaluation function that evaluates the quality of data collected from various IoT devices connected to (or managed by) it.

The IoT data service part 330 may include a situational (or context-aware) information analysis function that analyzes situations around an IoT device based on the collected data and provides it according to an enabler application service or a user's request.

The IoT data service part 330 may include an unusual condition analysis function that analyzes unusual conditions of various components managed by the enabler based on the collected data and provides relevant information.

The IoT data service part 330 may include an enabler application service function that provides a variety of services according to a user's needs or desired environment.

Referring to FIG. 3, the trust management part 340 serves to manage trust, which is one of the key functions of the trust enabler, i.e., a function that analyzes trust in various IoT resources and service users belonging to the trust enabler and provides analysis results.

The trust management part 340 may include a trust modeling function that classifies factors affecting the analysis of trust in each trustee and the properties of analysis models, in order to analyze trust in various IoT resources and stakeholders managed by the trust enabler.

The trust management part 340 may include a trust index analysis function that defines a group (of trust indicators) affecting the level of trust and performs trust analysis, based on a modeling method, in order to quantify trust and actually interpret trust analysis results.

The trust management part 340 may include a trust information provision function that provides service users with trust information (e.g., trust indicators) analyzed by the trust enabler in various forms (e.g., visualization).

The trust management part 340 may include a function for brokering trust information between IoT domains, which calculates trust in such a way as to standardize and share different trust calculation results that may be subordinate to different environments managed by different trust enablers where the trust enablers exchange information.

Figure 4:
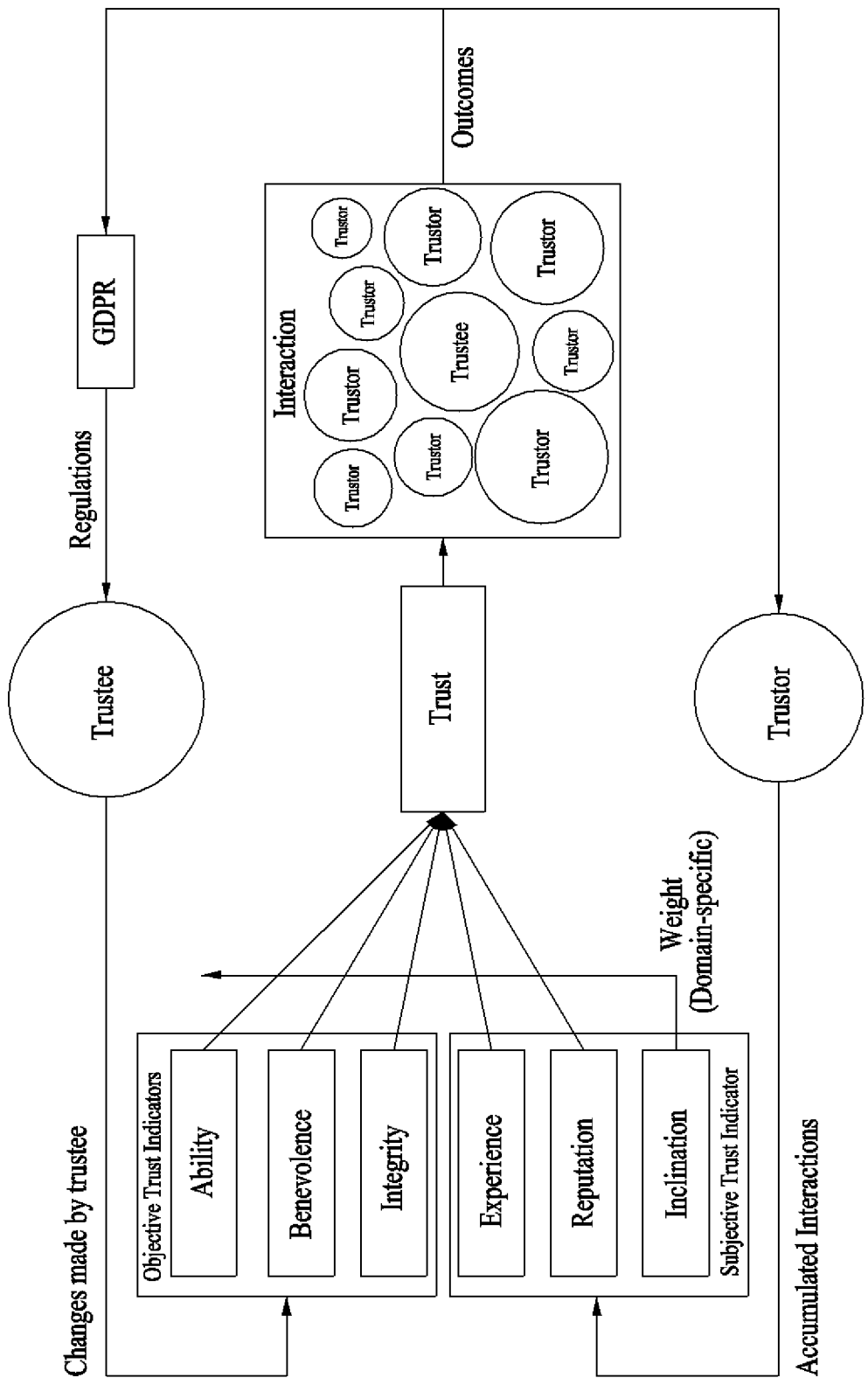
FIG. 4 is a view illustrating a model for trust analysis according to an embodiment of the present disclosure.

FIG. 4 is a view illustrating a model for trust analysis according to an embodiment of the present disclosure.

The trust management part 340 may analyze information on IoT resources and stakeholders based on a modeling method for trust evaluation, various algorithms, and techniques such as artificial intelligence and finally evaluate trust in the IoT resources and stakeholders using system and user inputs, in order to quantify trust in the IoT resources and stakeholders belonging to the trust enabler in an environment where the trust enabler operates.

Although the trustee is limited to the IoT resources and stakeholders belonging to the trust enabler, the level of trust in an IoT-based service belonging to the trust enabler also may be evaluated.

Based on trust indicators defined in a trust enabler environment, a trustor may evaluate the level of trust in a trustee. As depicted in FIG. 4, a model for trust analysis may be constructed.

$$\text{Trust} = W'I = \sum_{l \in \text{Indicator}} w_l \cdot i_l, \quad \text{[Equation 1]}$$

$$\text{Trust} \in [0, 1] \, I = \text{Trust}_{indicator} = \begin{bmatrix} i_{Ability} \\ i_{Benevolence} \\ i_{Integrity} \\ i_{Experience} \\ i_{Reputation} \end{bmatrix},$$

$$i \in [0, 1] \, W = \text{Weights} = \begin{bmatrix} w_{Ability} \\ w_{Benevolence} \\ w_{Integrity} \\ w_{Experience} \\ w_{Reputation} \end{bmatrix}, \sum_{l \in \text{Indicator}} w_l = 1$$

The trust indicators for trust analysis may be defined as follows in IoT environment based on conventional trust indicators. The trust indicators may include direct indicators and indirect indicators.

The direct indicators may include indicators that allow for evaluation from direct information without interaction between trustor and trustee, which means that the value of an indicator for a trustee is the same regardless of who does the evaluation. The direct indicators may include ability, benevolence, and integrity.

Ability may include the operational performance of a trustee, i.e., an IoT resource or a stakeholder, or their competence in assigned roles. In other words, ability refers to a group of skills, competencies, and characteristics that enable a trustee to have influence within some specific domain and area.

Benevolence is a characteristic of a trustee, i.e., an IoT resource or a stakeholder, who performs an operational process or an assigned role, and may include accuracy, integrity, and the timeliness of information provided to other resources or stakeholders. In other words, benevolence is the extent to which a trustee is believed to want to do good to the trustor, aside from an egocentric profit motive.

Integrity is a characteristic of a trustee, i.e., an IoT resource or a stakeholder, who adheres to their principles or comply with standards, and may include the accuracy, completeness, and consistency of an operation or the timeliness of information provided to other resources or stakeholders. That is, integrity refers to the trustor's perception that the trustee adheres to a set of principles and complies with standards that the trustor finds acceptable.

The indirect indicators may include indicators that allow for evaluation from additional information derived from interaction between trustor and trustee, which means that the value of an indicator for a trustee may not be the same depending on who does the evaluation. The direct indicators may include experience, reputation, and inclination.

Experience is accumulated interactions with a trustee, i.e., an IoT resource or a stakeholder, and may include the frequency or extent of use and a resulting relationship. That is, experience represents an observation about interactions between trustor and trustee and refers to the state of accumulation of interactions.

Reputation is the trustor's public assessment regarding the trustee's prior behaviors and performance, and may include both an assessment from the provider's own experience and assessments from other specific providers.

Inclination represents the level of importance of trust indicators in evaluating the level of trust in an IoT resource or stakeholder belonging to the trust enabler. In other words, inclination refers to how much importance the trustee places on each of the indicators. This may be expressed as a weight in calculating trust, and its value may vary for each service domain or each trustee, based on the provider's experience and reputation.

Figure 5:
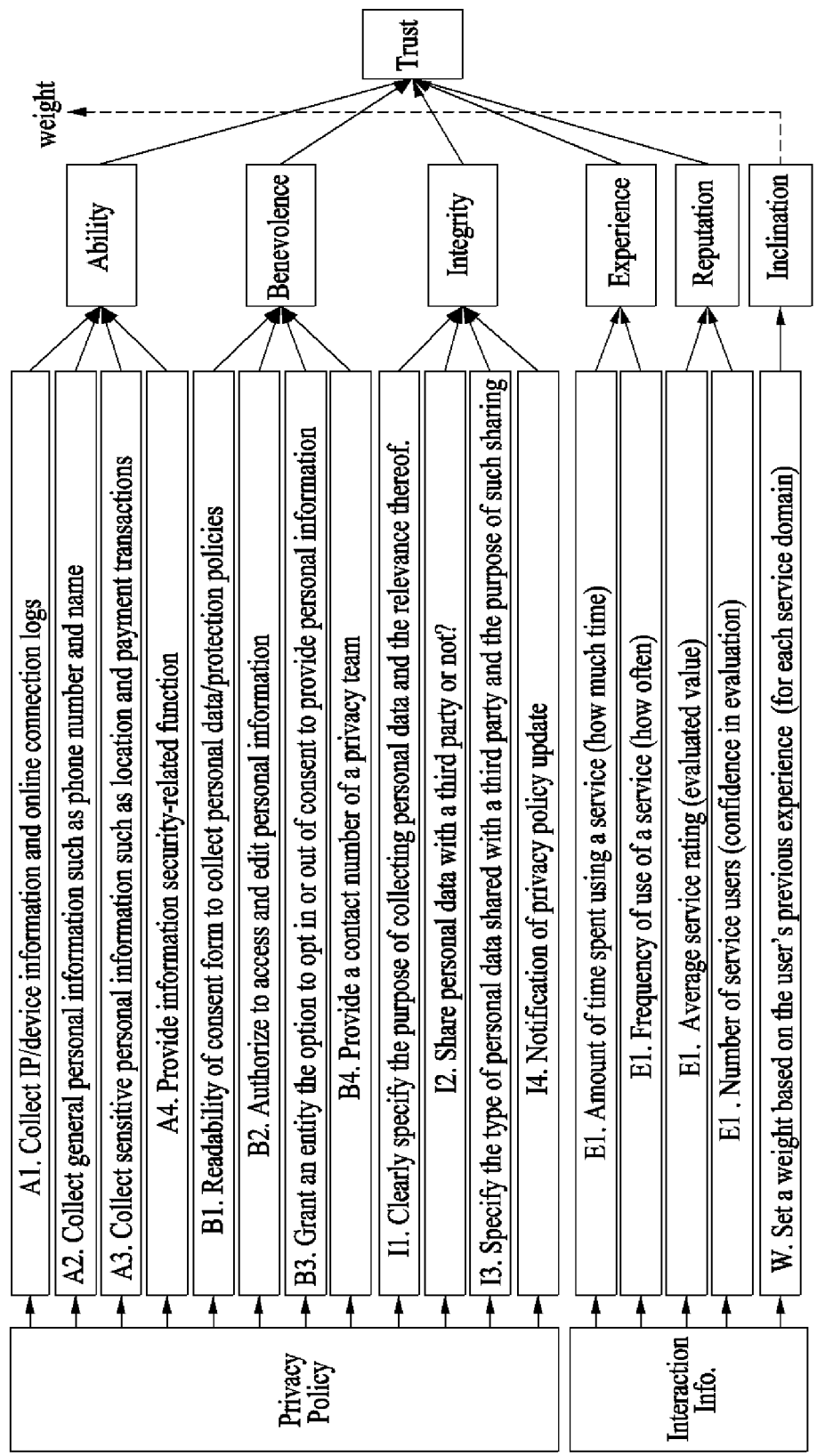
FIG. 5 is an exemplary view illustrating a method of calculating trust indicators according to an embodiment of the present disclosure.

FIG. 5 is an exemplary view illustrating a method of calculating trust indicators according to an embodiment of the present disclosure.

FIG. 5 shows an example of a process of calculating trust in a stakeholder collecting personal information who a trustee belonging to the trust enabler.

The trust management part 340 may calculate trust indicators by checking the requirements illustrated in FIG. 5 in a personal information environment. Each of the questions may have a value from 0 to 1 depending on the requirements stated in document information (e.g., privacy policies, privacy statements, etc.) related to privacy protection, and the weighted sum of values obtained by evaluating the questions corresponding to each trust indicator may have a value from 0 to 1.

The inclination indicator is an indicator representing a weight for each of five trust indicators used in a model for trust evaluation. Each weight may have a value from 0 to 1, and the sum of the weights may not exceed 1.

The direct indicators may be calculated by applying a natural language processing technique to the text in the document information related to privacy protection, analyzing the text by binary classification, and checking the following requirements. The requirements stated below are only an example and not limiting.

A1. Collect personal information on a device or the internet such as IP address, Device ID, cookies, and logs?
Score—if collect: 0; if not collect: 1

A2. Collect general personal information such as phone number, email, name, and age?
Score—if collect: 0; if not collect: 1

A3. Collect sensitive personal information such as location data and payment transactions?
Score—if collect: 0; if not collect: 1

A4. Support an information security-related function for collected data or a method of collection?
Score—if not supported: 0; if supported: 1

B1. Provide an appropriate consent form to collect personal data with a good level of readability?
Score—min(1, Flesch reading ease score/70)

B2. Guarantee rights such as an information entity's rights to access and edit?
Score—if include data edit: 1; if include only data view: 0.5; none: 0

B3. Does an information entity have the option to opt in or out of consent to collect information?
Score—opt-in/out: 1; browser/device/service control: 0.7; no service feature: 0.4; none: 0

B4. Provide a contact number that can be reached for questions related to personal data?

I1. Is the purpose of collecting and using personal data clearly specified?
Score—number of collected data with purposes explained/number of shared data I2. Will collected personal data be shared with a third party?
Score—if share: 0; if not share: 1

I3. If shared, is the purpose of sharing clearly specified?
Score—number of shared data with purposes explained/number of shared data I4. Will a notification be sent if there is a privacy policy update?
Score—if not notify: 0; if notify: 1

Moreover, the indirect indicators, unlike the direct indicators, are derived from an accumulation of interactions between a personal information provider and a personal information collector. Thus, information representing subjective factors such as a past history of use by the personal information provider and views on the personal information provider may be inputted from an external system or directly from the user. The following is an example of the requirements for the indirect indicators. The requirements stated below are only an example and not limiting.

E1. The amount of time spent using a service for which personal information needs to be provided (foreground+background)
Score—hours per day/24 hours E2. The frequency of use of a service for which personal information needs to be provided (foreground+background)
Score—min(1, number of uses per day/user-specified threshold for each service)

R1. Average rating of a service for which personal information needs to be provided (the user's rating+other users' ratings)
Score—average service rating/highest rating possible on the system R2. Number of raters who rated a service for which personal information needs to be provided
Score—min(1, Number of raters/user-specified threshold for each service)

W. Importance (weights) on trust indicators: ability, integrity, experience, and reputation
Score—default: 0.2 (all); user input The trust management part 340 may automate the analysis of privacy policies and statements by learning and optimizing a random forest classification approach, which is a method of guided learning, based on an OPP-115 dataset which is a dataset annotated for various categories. In this case, 115 privacy policies included in the dataset may be sampled and selected based on various categories (e.g., arts, shopping, games, society, computer, sports, leisure, health, news, and so on).

The trust management part 340 may vectorize text in document information related to privacy protection prior to binary classification so that a machine understands it. Text vectorization is a method of vectorizing data consisting of text such as words, sentences, paragraphs, and topics, in which data is converted such that machines incapable of recognizing general words literally like humans do can understand the meaning of the text. In text vectorization, learning is done prior to application of a machine learning technique such as classification, and inputs to be used for machine learning may be converted into vectors based on learned word vectors. There may be a wide variety of vectorization techniques, and they may exhibit performance differences between areas and between dataset attributes.

The trust management part 340 may segment text contained in a policy/statement based on a line break ('\n') for the analysis of document information related to privacy protection and vectorize the attributes of each segment (sentence/paragraph). In this case, a variety of vectorization techniques may be used to vectorize each sentence/paragraph, including a bag of words, count vectorizer, and word embedding, and are not limited to one specific technique.

Also, all vectors for all vectorization techniques may be extracted and saved according to the user's selection or for the sake of performance and efficiency, or a specific vectorization technique may be selected.

The trust management part 340 may classify vectorized inputs to calculate the direct indicators. The trust management part 340 may perform random forest binary classification on all categories to be evaluated for each sentence or paragraph in document information related to privacy protection that is vectorized by sentence or paragraph segmentation. In the embodiment, random forests may be employed in which test results of various machine learning techniques show the highest levels of performance and security, and may perform multiple binary classification tasks, not a single multiclass classification task, since one sentence or paragraph may contain multiple pieces of information. Random forests (random decision forests) are an ensemble method in which a multitude of decision trees are constructed and the results from the decision trees are combined. Here, the decision trees work by splitting decisions into branches in order to send an "example" as a final prediction class value.

Moreover, the OPP-115 dataset used for training a model for trust evaluation has a hierarchical structure and some categories are highly dependent on higher-level categories. Thus, hierarchical classification may be used to take dependencies between categories into account and improve efficiency. For example, unless data is collected, there will be no data type and no purpose of collection. For example, a hierarchical classification consisting of multiple steps may be applied based on the structure of the OPP-115 dataset. In the embodiment, a hierarchical classification consisting of four steps may be applied to take dependencies between categories into account and improve efficiency.

The trust management part 340 may perform a final evaluation of trust in a personal information collector based on the results of analysis of privacy policies and statements and system inputs.

The trust management part 340 may receive inputs such as amount of time spent using the service, frequency of use, and average rating from the system and calculate the indirect trust indicators. If the trust management part 340 receives no input for a specific indirect trust indicator, the indicator remains null and is not used for a final trust calculation. The trust management part 340 may save the calculated values of the indirect trust indicators.

The trust management part 340 may calculate the direct indicators based on the results of analysis of privacy policies and statements. If the trust management part 340 receives an additional information input such as a list of collected data types from the system, in addition to the privacy policies and statements, the additional information input may be used as well. The trust management part 340 may save the calculated values of the direct trust indicators.

The trust management part 340 may perform a final evaluation by adding weights for the indirect indicators and direct indicators that are inputted from the user. If there is no weight input from the user, the same weights (1/n) may be used by default which add up to 1 when summed. The trust management part 340 may store input values set by the user, such as weights, in storage. Referring back to FIG. 3, the IoT resource management and control part 350 performs various roles according to the user's request, including registration, configuration, management, distribution, and control of various IoT resources registered in the trust enabler system.

The IoT resource management and control part 350 may include an IoT resource discovery function that supports searching for and connecting to an available IoT resource (device, equipment, etc.) registered in the trust enabler system.

The IoT resource management and control part 350 may include an IoT resource configuration function that configures the operation of an IoT resource according to an object when mapping a new service, in order to manage and control the IoT resource.

The IoT resource management and control part 350 may include an IoT resource orchestration function that allows for organic management and control of multiple resources by coordinating the relationships between the resources or the order of execution when managing and controlling multiple IoT resources.

The IoT resource management and control part 350 may include an IoT resource distribution function that provides information on IoT resources so that external services or users are informed about and use IoT resources registered in the trust enabler.

The IoT resource management and control part 350 may include an IoT resource control function that provides a variety of control methods for accessing an IoT resource so that external services or users control a distributed IoT resource according to their conditions.

Figure 6:
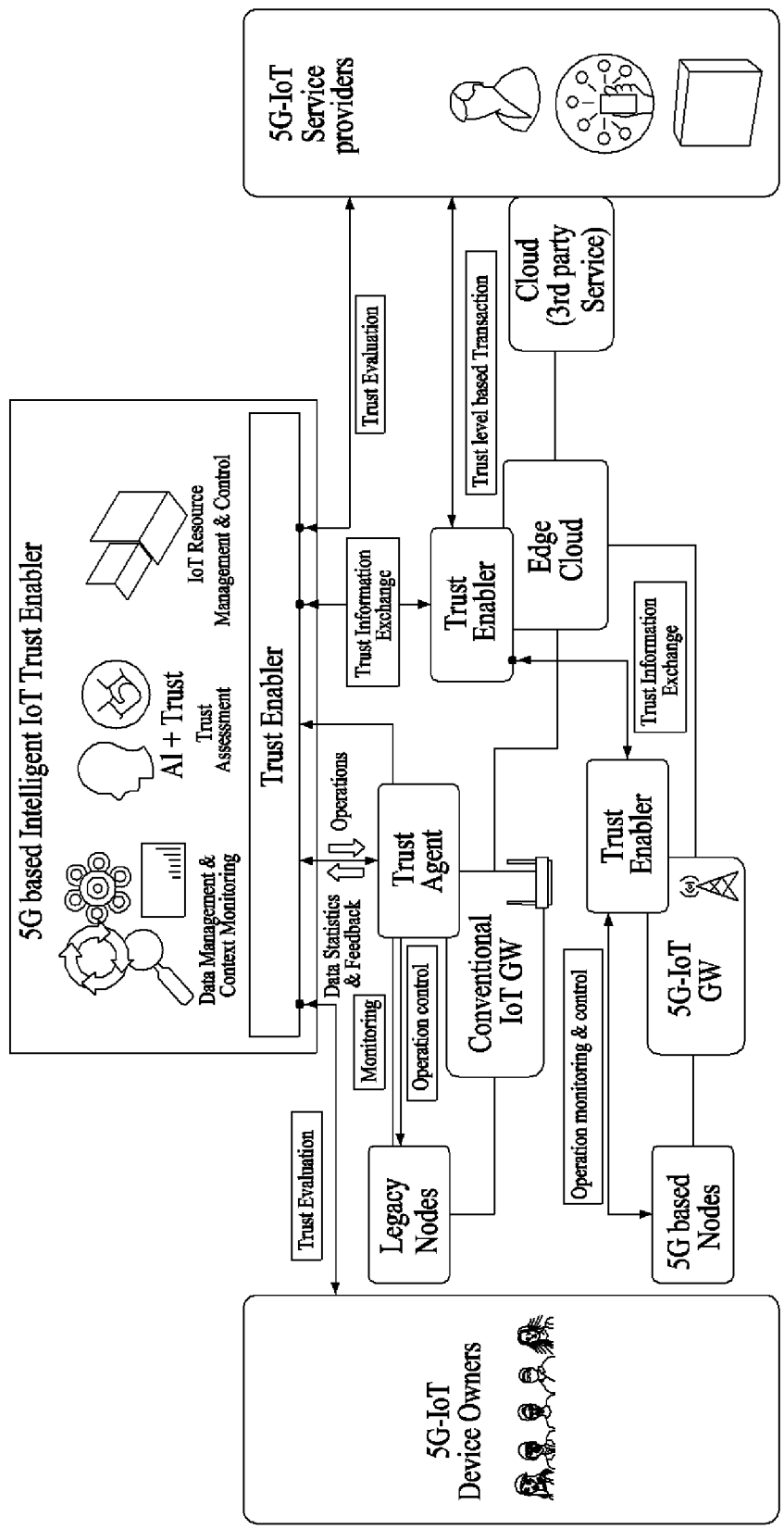
FIGS. 6 and 7 depict an example of a service scenario using an IoT trust enabler according to an embodiment of the present disclosure.
Figure 7:
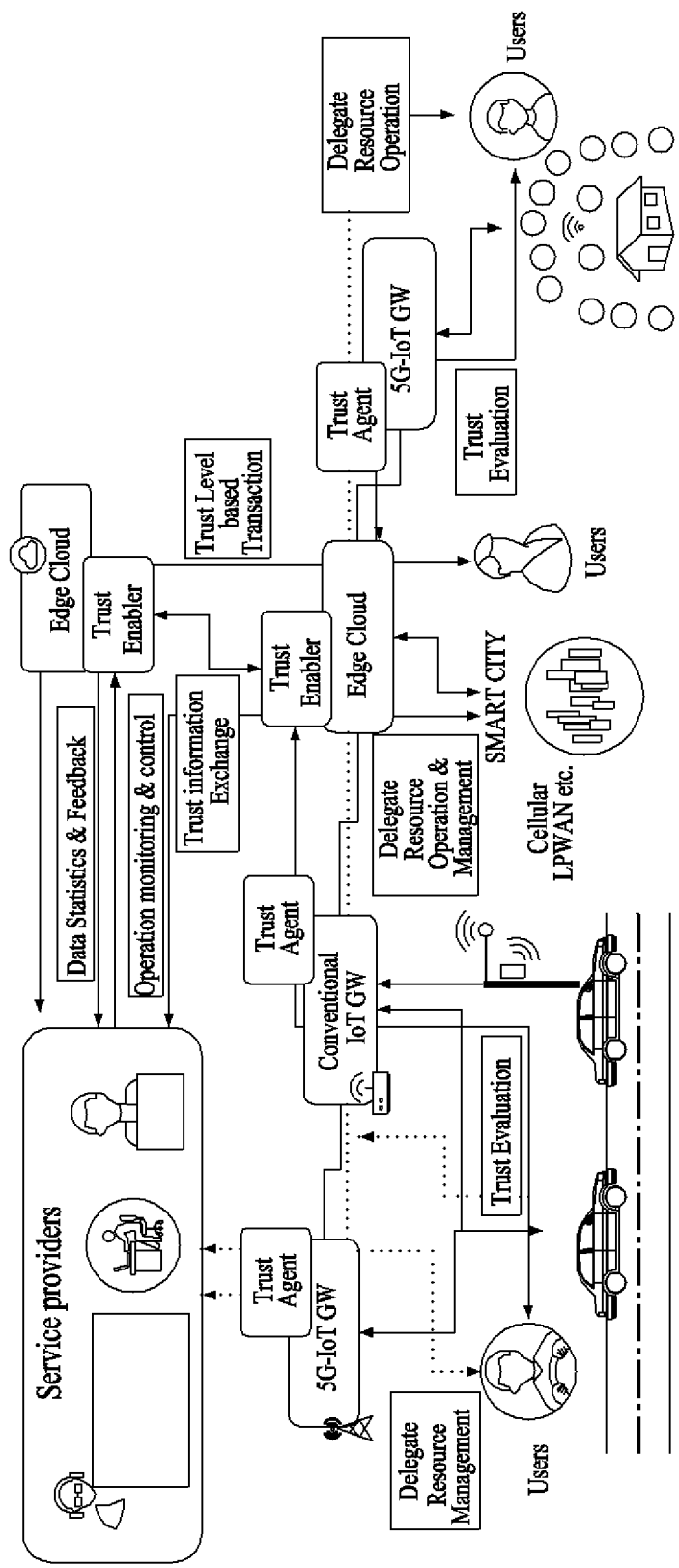

A trust enabler dashboard for monitoring and resource management and control may be serviced through an intelligent IoT trust enabler between a 5G IoT device and an IoT service, (see FIG. 6), or data management and context monitoring may be serviced through an intelligent IoT trust enabler between users in various environments such as a road, a city, and a home and a service provider (see FIG. 7).

A variety of scenarios for evaluating trust in users, equipment, service providers, owners, and so on may be derived for resources like smart offices that can be shared, and a smart office resource management environment that can show PoC later may be selected. Stakeholders may correspond to an office user, a building manager, an IoT equipment management agency service, etc., and objects of operation and management may correspond to a variety of IoT equipment such as a smart office sensor.

The IoT trust enabler system according to the present disclosure may be applied in environments that need to be efficiently monitored and controlled by ensuring trust in electronics usage data, power consumption data, and sensing data from a mobile device, through a 5G infrastructure. Also, the spread of advanced metering infrastructures (AMI), coupled with the dissemination of the smart grid concept, is driving incorporation of 5G networks for connection management, and an IoT trust enabler system may be applied for reliable management of AMI devices which are increasingly used.

As such, according to the embodiments of the present disclosure, an IoT device owner in a 5G-IoT environment may entrust the management of their device, and an IoT platform/service manager may support trust indicator definition and analysis techniques for ensuring data trust in IoT environments to make decisions about a situation based on trust and also support resource management and control for accurate and efficient operations of IoT resources, in order to realize an environment that allows for efficient operation and management of resources.

According to the embodiments of the present disclosure, it is possible to reduce management costs and obtain high-reliability data by means of an IoT trust-based autonomous control service, which may contribute to discovery of a variety of new industries based on a trust enabler technology and hopefully lead to the development and training of IoT expert workforce and consequently to the creation of more jobs through activation of IoT markets.

The aforementioned system may be implemented in the form of a hardware component, a software component, and/or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The invention claimed is:

1. A computer system comprising at least one processor configured to execute computer-readable commands contained in a memory,
   the at least one processor comprising:
   an IoT (Internet of Things) trust enabler mounted on an edge and gateway on a fifth-generation (5G) IoT infrastructure, for providing trust information based on data collected from IoT devices and performing operation and management of connected IoT resources; and
   an IoT trust agent for providing a legacy environment for the IoT trust enabler.

2. The computer system of claim 1, wherein the IoT trust enabler comprises a function for checking whether an IoT device that has transferred the data is suitable or not, including whether the corresponding IoT device is connectable or not, and a function for managing and controlling access from the IoT device that has transferred the data by managing a trust specification of the corresponding IoT device.

3. The computer system of claim 1, wherein the IoT trust enabler comprises a function for classifying the data collected from the IoT devices according to data attributes, and comprises a data interoperation model for managing associations between data formats and data models, in order to process the data collected from the IoT devices into a single common form.

4. The computer system of claim 1, wherein the IoT trust enabler comprises a function for transferring the data collected from the IoT devices to at least one other IoT trust enabler, and a function for transferring the data collected from the IoT devices to an external user.

5. The computer system of claim 1, wherein the IoT trust enabler comprises a function for analyzing situational (or context-aware) information related to a corresponding IoT device based on the data collected from the IoT devices and providing the same, and a function for analyzing unusual conditions based on the data collected from the IoT devices and providing analysis results.

6. The computer system of claim 1, wherein the IoT trust enabler comprises a function for analyzing trust in at least one among an IoT resource, a stakeholder, and an IoT-based service that belong to the IoT trust enabler and providing trust analysis results.

7. The computer system of claim 6, wherein the IoT trust enabler defines indicators affecting the level of trust and performs trust analysis, based on a modeling method in which factors affecting the analysis of trust in each trustee and analysis models are classified.

8. The computer system of claim 6, wherein the IoT trust enabler standardizes the trust analysis results and provides the same to at least one other IoT trust enabler.

9. The computer system of claim 6, wherein the IoT trust enabler constructs a model for evaluating the level of trust in the trustee and calculates trust indicators by training the constructed model on information related to the trustee.

10. The computer system of claim 9, wherein the trust indicators comprise direct trust indicators including at least one of ability, benevolence, and integrity which are indicators that allow for evaluation from direct information without interaction between trustor and trustee, and indirect trust indicators including at least one of experience, reputation, and inclination which are indicators that allow evaluation from additional information derived from interaction between trustor and trustee.

11. The computer system of claim 9, wherein the IoT trust enabler calculates the trust indicators by applying a natural language processing technique to the information related to the trustee and analyzing the information processed by the natural language processing technique by binary classification.

12. The computer system of claim 9, wherein the IoT trust enabler calculates the trust indicators by receiving, as input, information representing subjective factors including a past history of use by the trustee and views on the trustee from an external system or from the user.

13. The computer system of claim 10, wherein the IoT trust enabler evaluates the level of trust in the trustee by adding weights for the indirect indicators and direct indicators that are inputted from the user.

14. The computer system of claim 1, wherein the IoT trust enabler comprises a function for searching for an available IoT resource registered in the IoT trust enabler and connecting to the same, a function for configuring the operation of an IoT resource according to a service object when mapping a new service, and a function for organically controlling multiple IoT resources by coordinating the relationships between the resources or the order of execution.

15. A method for controlling a trust enabler executed in a computer system,
the computer system comprising at least one processor configured to execute computer-readable commands contained in a memory,
the method comprising providing trust information based on data collected from IoT (Internet of Things) devices by using an IoT trust enabler mounted on an edge and gateway on a fifth-generation (5G) IoT infrastructure,
the providing of trust information comprises analyzing trust in at least one among an IoT resource, a stakeholder, and an IoT-based service that belong to the IoT trust enabler and providing trust analysis results,
wherein the IoT trust enabler defines indicators affecting the level of trust and performs trust analysis, based on a modeling method in which factors affecting the analysis of trust in each trustee and analysis models are classified.

16. The method of claim 15, wherein trust indicators are calculated by training a model on information related to the trustee so that the model evaluates the level of trust in the trustee.

17. The method of claim 16, wherein the trust indicators comprise direct trust indicators including at least one of ability, benevolence, and integrity which are indicators that allow for evaluation from direct information without interaction between trustor and trustee, and indirect trust indicators including at least one of experience, reputation, and inclination which are indicators that allow evaluation from additional information derived from interaction between trustor and trustee.

18. The method of claim 15, wherein the providing of trust information comprises providing, through the IoT trust enabler, a function for checking whether an IoT device that has transferred the data is suitable or not, including whether the corresponding IoT device is connectable or not, a function for classifying the data collected from the IoT devices according to data attributes, a data interoperation model for managing associations between data formats and data models, in order to process the data collected from the IoT devices into a single common form, and a function for managing and controlling access from the IoT device that has transferred the data by managing a trust specification of the corresponding IoT device.

19. The method of claim 15, wherein the providing of trust information comprises providing, through the IoT trust enabler, a function for transferring the data collected from the IoT devices to at least one other IoT trust enabler and a function for transferring the data collected from the IoT devices to an external user.

20. The method of claim 15, wherein the providing of trust information comprises providing, through the IoT trust enabler, a function for analyzing situational (or context-aware) information related to a corresponding IoT device based on the data collected from the IoT devices and providing the same, and a function for analyzing unusual conditions based on the data collected from the IoT devices and providing analysis results.

* * * * *